United States Patent
Hutin et al.

(10) Patent No.: US 9,260,942 B2
(45) Date of Patent: Feb. 16, 2016

(54) METHOD AND APPARATUS FOR OFF-RIG PROCESSING RIG SENSOR DATA

(75) Inventors: Remi Hutin, Bures sur Yvette (FR); Han Yu, Sugar Land, TX (US); Xueyuan Tang, Sugar Land, TX (US); Carlos E. Estevez, Katy, TX (US); Christopher P. Reed, West University Place, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 606 days.

(21) Appl. No.: 12/745,817

(22) PCT Filed: Dec. 4, 2008

(86) PCT No.: PCT/US2008/085561
§ 371 (c)(1),
(2), (4) Date: Jun. 2, 2010

(87) PCT Pub. No.: WO2009/073803
PCT Pub. Date: Jun. 11, 2009

(65) Prior Publication Data
US 2010/0256914 A1  Oct. 7, 2010

Related U.S. Application Data

(60) Provisional application No. 60/922,356, filed on Dec. 5, 2007.

(51) Int. Cl.
*G01V 1/40* (2006.01)
*E21B 41/00* (2006.01)
*E21B 44/00* (2006.01)
(Continued)

(52) U.S. Cl.
CPC .............. *E21B 41/00* (2013.01); *E21B 44/00* (2013.01); *E21B 47/12* (2013.01); *G01V 1/48* (2013.01); *G01V 1/50* (2013.01)

(58) Field of Classification Search
CPC ......... E21B 44/00; E21B 47/00; E21B 47/12; G01V 1/48; G01V 1/50
USPC ........... 702/9–13, 45–54, 118–124, 182–190, 702/6, 17
See application file for complete search history.

(56) References Cited

U.S. PATENT DOCUMENTS

2001/0056503 A1 * 12/2001 Hibbard ................... 709/250
2002/0124652 A1 *  9/2002 Schultz et al. ............. 73/587
(Continued)

FOREIGN PATENT DOCUMENTS

EP  0932054  *  7/1999
EP  1637695     3/2006
(Continued)

Primary Examiner — Paul D Lee

(57) ABSTRACT

Systems and methods for monitoring and/or operating a rig site system are provided. In accordance with one embodiment, a method for monitoring a rig site system may include obtaining sensor data at a rig site and transmitting pre-processed sensor data pertaining to the sensor data from the rig site over a network link to a monitoring site. The method may also include demodulating the pre-processed sensor data at the monitoring site to produce demodulated data. The method may also include analyzing the demodulated data at the monitoring site. The sensor data may comprise at least one of surface sensor data, MWD sensor data, or LWD sensor data, or any combination thereof.

37 Claims, 4 Drawing Sheets

(51) Int. Cl.
*E21B 47/12* (2012.01)
*G01V 1/48* (2006.01)
*G01V 1/50* (2006.01)

(56) References Cited

U.S. PATENT DOCUMENTS

| | | |
|---|---|---|
| 2003/0017845 A1* | 1/2003 | Doviak et al. ............... 455/556 |
| 2004/0206494 A1* | 10/2004 | Stephenson et al. ....... 166/250.1 |
| 2005/0035874 A1 | 2/2005 | Hall et al. |
| 2005/0189142 A1 | 9/2005 | Garcia et al. |
| 2005/0284659 A1* | 12/2005 | Hall et al. ..................... 175/27 |
| 2008/0236837 A1* | 10/2008 | Lovell et al. .................. 166/336 |
| 2010/0147510 A1* | 6/2010 | Kwok et al. .............. 166/250.01 |
| 2010/0256914 A1 | 10/2010 | Hutin et al. |

FOREIGN PATENT DOCUMENTS

| | | | |
|---|---|---|---|
| EP | 1653044 | 5/2006 | |
| GB | 2353546 | 2/2001 | |
| GB | 2376704 | 12/2002 | |
| GB | 2389601 | 12/2003 | |
| WO | WO 2008038288 A2 * | 4/2008 | ............ G01C 19/00 |

* cited by examiner

METHOD AND APPARATUS FOR OFF-RIG PROCESSING RIG SENSOR DATA

BACKGROUND OF THE INVENTION

The present invention relates generally to oil well rig operations and, more particularly, to efficiently and reliably monitoring and processing pre-processed sensor data from a location apart from the rig site.

Monitoring and analysis of downhole telemetry and rig site data requires monitoring of the telemetry and acquisition system hardware and software to ensure that equipment at the rig site is operating properly. Specifically, a field engineer is typically located at the rig site to rapidly verify that telemetry and surface sensor data are acquired, demodulated, decoded, and processed properly. The engineer is typically at the rig site to use software to extract the information about operation from the acquired data and to provide the information about operation sent by the downhole tools or other surface information to clients for real time drilling and well control. Also, the engineer is able to identify and correct any operational or hardware problems immediately. Further, a monitoring system that enables real time control and adjustment of the sensors, hardware, and software often requires an experienced engineer at the location of the equipment to efficiently and accurately interpret what the rig site telemetry and surface sensor data indicates about operation.

Experienced engineers are costly resources that are often too valuable to be deployed to a single oil rig site for extensive periods of time. Indeed, the cost of dedicating one or more experienced engineer to a rig site is also a safety concern. In situations where an engineer's knowledge and experience are valuable, company management often desires to reduce the amount of time engineers spend at any one rig site.

According to systems used prior to the present disclosure, a final display of processed data modulated at the rig site is the extent of data that is viewable remotely (relative to the rig site) due to bandwidth limitations. In fact, due to bandwidth limitations, such a display at a location apart from the rig site may merely allow Operations Support Center personnel to view the final display of data, but does not enable active manipulation of data and troubleshooting that is often needed when errors on the display are identified. Such a display may also suffer from interruptions and slowdowns in data transmission due at least partially to the size of the processed telemetry and surface sensor data and limitations in satellite transmission rates, further complicating and delaying real time monitoring and control, which is desirable to operate oil well rig sites.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in detail below, a rig site monitoring system may be utilized to monitor and/or control operations and data acquisition for an oil rig site from a location apart from the rig site. Specifically, in one embodiment, information such as telemetry and surface sensor data may be acquired at the rig site, which may be critical to the operation of an oil rig site. As discussed herein, telemetry and surface sensor data may be obtained using measurements while drilling (MWD) and logging while drilling (LWD) techniques and tools, and used to evaluate physical properties of a rig site and a well being drilled and the formation through which the well passes. Telemetry and surface sensor data may be acquired by a data acquisition system that includes hardware and software to measure the telemetry and surface sensor data signals and enable an engineer to assess the performance and operations at a rig site. In accordance with embodiments of the present invention, signals or data from the data acquisition system's sensors may be preprocessed, creating a low bandwidth pre-processed sensor data stream to be transmitted to a monitoring site. Specifically, the low bandwidth pre-processed sensor data stream may be transmitted via a network link to a monitoring site location for analysis by an engineer or Operations Support Center personnel. As appreciated, a central site apart from the rig site, configured to monitor rig sites, may enable a single engineer or Operations Support Center personnel to efficiently monitor and evaluate the performance of several rig systems from a central location, where each of the rig sites are located offshore and/or a great distance from the monitoring site.

Figure 1:
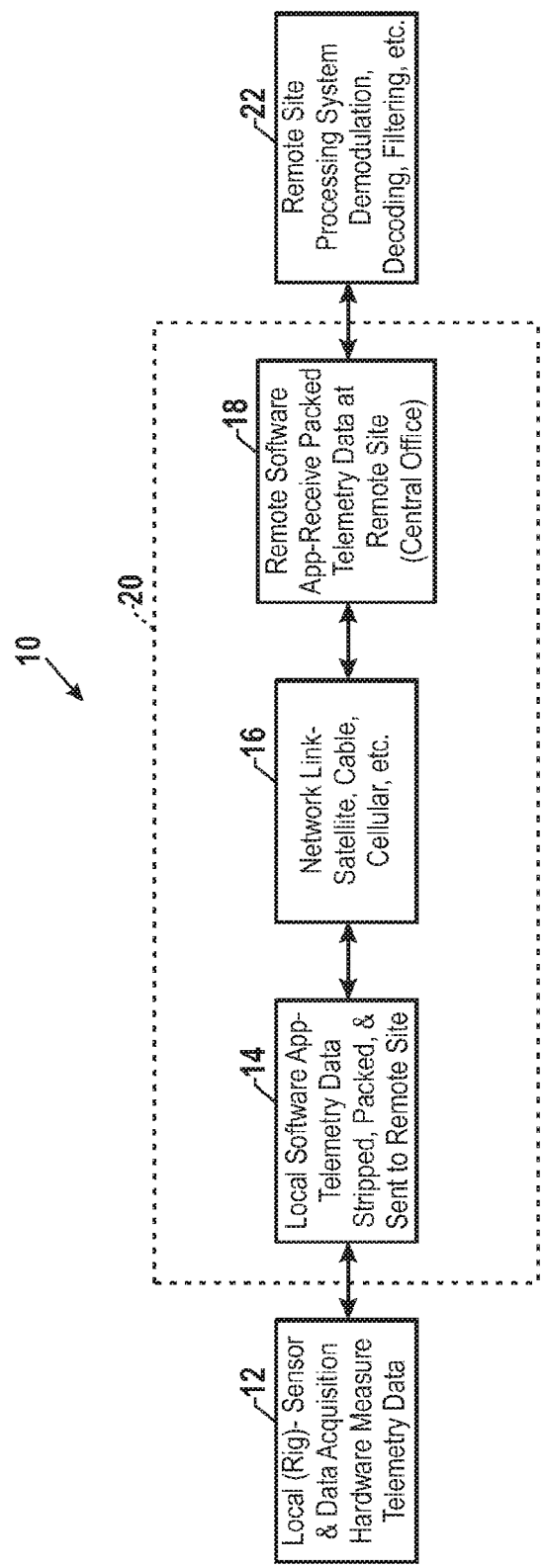
FIG. 1 is a block diagram of an oil rig data acquisition and off-rig monitoring system in accordance with an embodiment.

Turning to the drawings, FIG. 1 is a block diagram of an oil rig data acquisition and off-rig monitoring and control system 10. In the illustrated embodiment, oil rig data acquisition and off-rig monitoring and control system 10 includes a data acquisition system 12 located at a rig site and configured to receive telemetry and surface sensor data and surface acquired data. For example, the data acquisition system 12 may include data acquisition hardware, such as analog-to-digital (A/D) converters, as well as other hardware and software to process measurement signals acquired by the data acquisition system 12. The components of the data acquisition system 12 may be configured to evaluate physical properties of the rig site, via telemetry and surface sensor data, including pressure, temperature, vibration, and well bore trajectory, during the extension of a well bore. The telemetry and surface sensor data may include various signals, such as from Surface Pressure Transducer (SPT), a voltage signal (STAKE), and other pertinent signals. SPT comprises a sensor that measures the mud pressure at the surface between a mud pump and a drill pipe. In an embodiment, the sensor is sampled hundreds of times per second. Specifically, 480 samples per second may be acquired. Further, in an embodiment, STAKE comprises a copper rod, that may be driven into the earth about 400 feet away from a rig site. A STAKE signal measurement may include a voltage difference between the copper rod and the casing of the well, which may be used to detect a signal from an electromagnetic MWD transmitter. Other measurement signals may include surface weight-on-bit (WOB), hook load, draw-works movement to calculate a depth of the bit in a well, torque applied to rotate the pipe, mud pump speed, and radioactivity of the mud used in the wellbore.

The sensor data acquired by the data acquisition system 12 (e.g., LWD or MWD) may transmitted to the surface via cables, wireless connection, mud pulse telemetry, wired drill pipe, EM telemetry, or other suitable methods. In some embodiments, the sensor data may be stored downhole in memory and transmitted after a certain period of time to the surface in packets of data.

Components located locally at the rig site, such as a software application on a local controlling computer, may pre-process the telemetry and surface sensor data. Specifically, during preprocessing, the telemetry and surface sensor data may be modified into a pre-processed sensor data stream, such as by compressing, stripping, or packing of the data, for transmission via a network link to a monitoring site. For example, the telemetry and surface sensor data may be down sampled via an anti-aliasing method if there is little or no useful information at higher frequencies, and the data may be packed to produce a lower bandwidth pre-processed sensor data stream that may be more effectively transmitted to an off-rig location. For instance, the pre-processed sensor data stream may be packed to enable a transmission rate of between 2000 to 5000 bits per second. In other words, the telemetry and surface sensor data may be pre-processed to produce the pre-processed sensor data stream that is optimal, via compression or other techniques, for transmission. The pre-processing may include compressing, packetizing, encrypting, and/or decimating the telemetry and surface sensor data to produce the pre-processed sensor data stream. In some embodiments, the pre-processing may reduce the bandwidth needed to transmit the pre-processed sensor data stream. For example, SPT data at 480 samples per second may be down sampled/packed into a pre-processed sensor data stream of 120 samples per second. In another example, a stream of telemetry sensor data may be down sampled/packed from 480 samples per second to 40 samples per second. Some of the surface channels, such as torque, can be reduced from 480 to 2 samples per second. In such examples, the low bandwidth data stream may be a combination of several telemetry and/or surface sensor measurements that comprise the pre-processed sensor data stream which is transmitted at a rate of 2000 to 5000 bits per second. In another embodiment, the pre-processed sensor data stream may be packed or compressed to a bandwidth of 100 to 2000 bits per second.

The pre-processed sensor data stream may then be transmitted via a network link 16 to an off-rig location. The network link 16 may utilize any suitable hardware, software, and/or communication techniques that are robust, efficient, and low cost. For example, the network link 16 may include a satellite communication, a network cable link, a cellular communication link, or any combination thereof. In an embodiment including complex telemetry and surface sensor data transmission, the pre-processing system components of block 14 may compress or pack the pre-processed sensor data stream to a bandwidth of 20,000 bits per second or more. Specifically, in an embodiment, a satellite based communication link may transmit the pre-processed sensor data stream at a rate of 128,000 to 512,000 bits per second. As will be discussed in detail below, any one of a plurality of networks within the network link 16 may be used to transmit the pre-processed sensor data stream, to ensure that a backup network system is available to transmit the pre-processed sensor data stream if a primary network is unavailable.

A receiving system 18 located at an off-rig site comprising system components, such as software, hardware, and/or a computer configured to receive and process the low bandwidth pre-processed sensor data stream may receive the pre-processed sensor data stream via the network link 16. Block 20 encompasses blocks 14, 16, and 18, and may be described as an "off-rig acquisition link system" that may be used to pre-process and transmit a low bandwidth pre-processed sensor data stream from a rig site to an off-rig location, and optionally redundantly process the pre-processed sensor data stream locally.

The pre-processed sensor data stream received at the monitoring site processing system 22 may be processed for analysis and recording. For example, the monitoring site processing system 22 may be configured to demodulate and decode the pre-processed sensor data stream, thereby processing measurement signals that may be filtered, and/or processed via a processor. Further, other analysis may be performed on the pre-processed sensor data stream at the off-rig monitoring site, such as coupling or matching the demodulated data stream to time stamps, channel IDs, and other information that may also be transmitted via the off-rig acquisition link system 20 with the pre-processed sensor data. Time stamps may ensure that the monitoring site can properly decode the pre-processed sensor data stream for detailed analysis of the pre-processed sensor data stream. Once the pre-processed sensor data has been processed at the monitoring site processing system, the demodulated data may be displayed to an engineer or Operations Support Center personnel to assess the state and operation of the rig site and its components. Moreover, the display of telemetry and surface sensor data at an off-rig site may be viewed in a real time manner by an engineer or Operations Support Center personnel, or substantially in real time. For example, when viewing data substantially in real time, an engineer or Operations Support Center personnel may view a display of telemetry and surface sensor data at a monitoring site within approximately five seconds of when the same data would be displayed at a local rig location. The viewing latency of the off-rig near real time display may range from 0.001 to 5 seconds. Further, in another example, the viewing latency may range from 1 to 10 seconds, from 2 to 25 seconds, or from 5 to 40 seconds. Accordingly, in the illustrated system of FIG. 1, the engineer or Operations Support Center personnel views the data substantially in real time, thereby enabling an analysis at an off-rig location at effectively the same level as an engineer or Operations Support Center personnel would experience at the local rig site. In the case of an interruption in network link 16, the viewing latency or difference between rig site and off-rig viewing may include a buffer of more than six hours of data. In such a case, a near real time latency is restored after the network link 16 is re-established. Moreover, the telemetry and surface sensor data may be recorded to a file and may be played back for reprocessing, trouble shooting, and analysis for post-mortem analysis.

Figure 2:
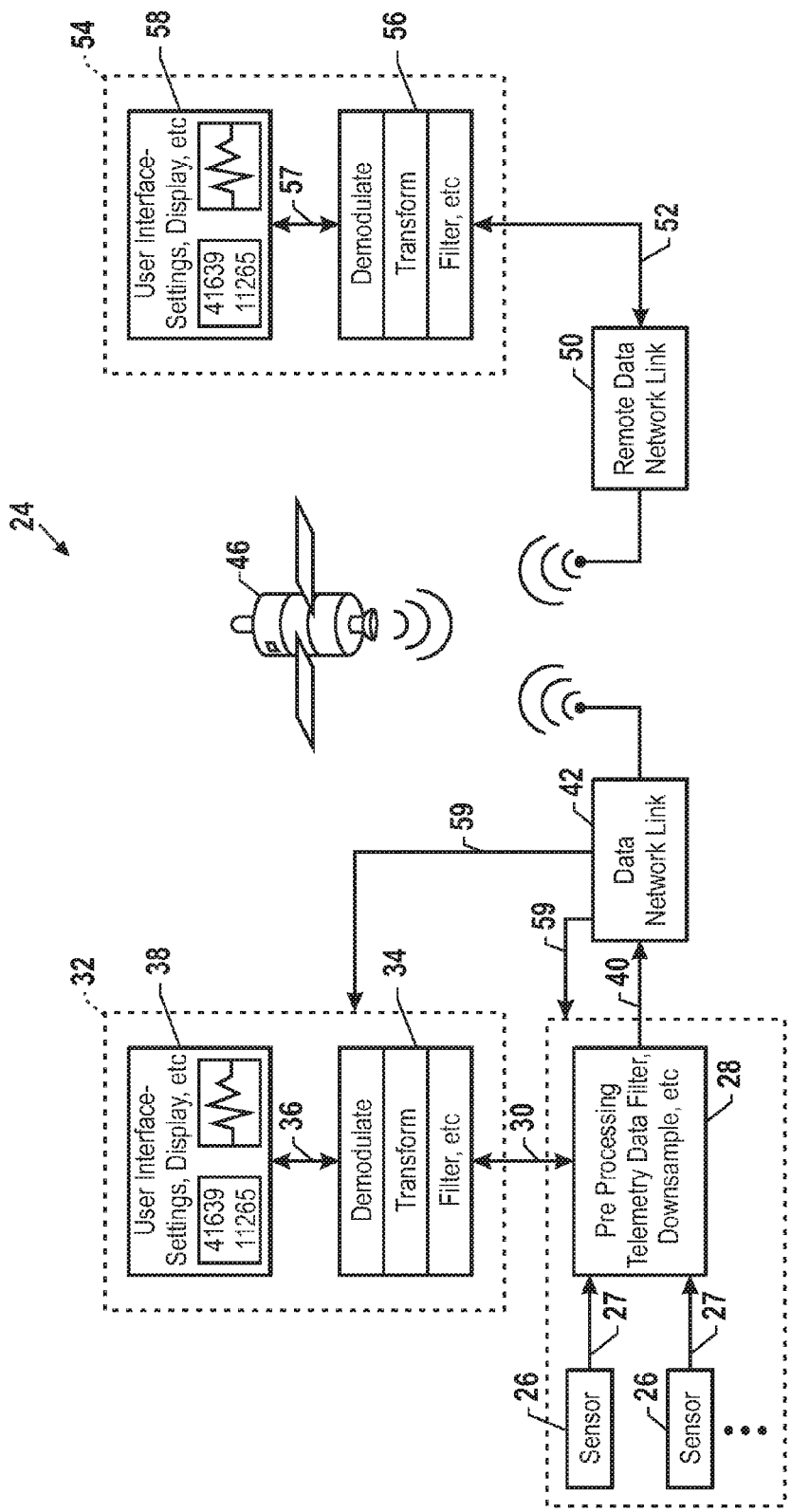
FIG. 2 is a schematic of a off-rig monitoring and control system, including rig site and off-rig processing system, in accordance with an embodiment.

FIG. 2 is a block diagram of an off-rig monitoring and control system 24. Specifically, the off-rig monitoring and control system 24 includes an oil rig data acquisition and off-rig monitoring and control system 10. The embodiment of the rig site monitoring system 24 includes a local system 32 and a monitoring site 54 connected by a communication system 46. In addition, the off-rig monitoring and control system 24 includes rig site sensors 26 that may include hardware and software configured MWD, LWD, and surface parameters that may be useful in monitoring the operation of a well or drilling operations at a rig site. For example, rig site sensors 26 may include accelerometers configured to measure vibration at a rig site connected by telemetry link 27 to preprocessing system 28. The preprocessing system 28 is configured to preprocess the telemetry and surface sensor data that comes from the telemetry and surface sensors into a pre-processed sensor data stream, in order to reduce the bandwidth needed for transmission of the pre-processed sensor data stream to a monitoring site 54. Preprocessing system 28 may include a processor, memory, hardware components (e.g., an analog to digital converter), and software to perform signal analysis and data translation functions. Further, the preprocessing system 28 may be configured to down sample the telemetry and surface sensor data via an anti-aliasing filter. For example, a signal acquired at 480 samples per second may be reduced to 120 samples per second based on frequency content required. In addition, a stream 30 of pre-processed sensor data may be sent to the local system for redundant processing or analysis (e.g., when an engineer or Operations Support Center personnel is, in fact, located at the rig site). In one embodiment, the preprocessing system 28 may also route the telemetry and surface sensor data directly to the data acquisition system 32 as shown by data connection 30.

As depicted, the local system 32 may also process the pre-processed sensor data at the rig site in local processing block 34. For example, a local processing system 34 may include a computer configured to down sample, demodulate, and perform other functions on the pre-processed sensor data. Specifically, various filters such as high pass and/or low pass filters, and transforms, such as IQ transforms, may be performed on pre-processed sensor data to allow an engineer at the rig site to analyze and assess the status of the rig site, well, and data acquisition system. Demodulation of telemetry and surface sensor data or pre-processed sensor data may include filtering, transforms, and other data processing techniques that may be useful to interpret telemetry data. Further, additional processing may occur after demodulating the telemetry and surface sensor data or pre-processed sensor data. Processing after demodulation may include breaking up the demodulated bits into measurement channels, for example. It may also include, combining several of these measurements into one measurement, such as downhole weight-on-bit and downhole torque. In an embodiment, processing may expand one of these measurements into several measurements as in a decompression operation. Further, processing could combine several measurements into an image of the borehole. In addition, processing could also include combining several surface measurements (where the demodulation step is trivial) such as hook load, drawworks encoder, and other measurements into the bit depth.

After processing by the local processing system 34, the pre-processed sensor data stream may be transmitted (such as via a bus 36) to a user interface 38, thereby enabling an operator at a rig site to view various parameters, analyze various aspects of the rig site, and/or adjust settings of the rig site and data acquisition system. The local system 32 includes components, such as hardware and/or software, configured to perform analysis and monitoring of the rig site system, as shown in the local processing system 34 and user interface block 38. For example, the local system 32 may include a computer and a LCD display to enable a engineer or Operations Support Center personnel to configure the system and perform analysis on the telemetry and surface sensor data.

Returning to the preprocessing system 28, the pre-processed sensor data stream is transmitted via a data connection 40 to a data network link 42. The data network link 42 may include any one of a satellite communication link, a cable based communication link (such as fiber optic, CAT5, CAT5e, or CAT6 for Ethernet), a cellular communication link, a Broadband global area network (BGAN), and/or any other suitable communication link for the low bandwidth pre-processed sensor data stream. In an embodiment, the pre-processed sensor data stream sent transmitted via connections 30 and 40 may be of the same bandwidth, including the same information. In the example, data connections 30 and 40 may transmit a reduced bandwidth as compared to telemetry link 27. Alternatively, the data sent via connection 40 may transmit a reduced bandwidth as compared to data passed via connection 30 and telemetry and surface sensor data passed via telemetry link 27.

The data network link 42 may include a plurality of available networks that may include redundant networks backing up a primary network. Specifically, a primary network may be used, due to its low cost, efficiency, and other factors, until it is unavailable, in which case the redundant or backup network may be used to transmit the low bandwidth data stream. When the main or primary network goes down the system automatically switches to a chosen backup network. When the primary network is restored, the system automatically switches back to the primary network link. The backup network ensures that the off-rig rig site monitoring process is a robust operation. In addition, factors such as available bandwidth and cost may be useful in determining which of the plurality of networks will be used by the data network link 42 to send the pre-processed sensor data stream. Further, the preprocessing system 28 and/or the data network link 42 may be configured to provide a buffer for the pre-processed sensor data stream, ensuring that the pre-processed sensor data stream is not lost when interruptions occur and/or the backup network links are used. For example, a satellite communication system may be the primary network link and may be used until an interruption occurs, in which case a backup network link, such as a cellular communication system, may be used to transmit the pre-processed sensor data stream to an off-rig location. As the pre-processed sensor data stream is switched from the satellite to the cellular system, a data buffer may be used to ensure that data is not lost. The pre-processed sensor data stream may be transmitted to a communication system 46, which is then transmitted to an off-rig data network link 50.

As depicted, the communication system 46 is a satellite communication system that may be configured to receive and/or transmit communications between data network links 42, 50. Moreover, data network links 42, 50 may be bidirectional, enabling communication in either direction between the rig site and off-rig location. For example, data network links 42, 50 may be configured for telemetry and surface sensor data to be sent to the central monitoring site and for rig site system adjustments to be communicated from the monitoring site (i.e., a central office) to the rig site.

Off-rig data network link 50 is configured to receive the pre-processed sensor data stream transmitted and received from data network link 42 via communication system 46. As previously discussed, the off-rig data network link 50 may be configured to communicate among several available network links, such as satellite, cellular, cable based systems, or a combination thereof. Further, the off-rig data network link 50 is configured to utilize a backup system in a situation where the primary network link is unavailable or otherwise undesirable.

Off-rig data network link 50 transmits the pre-processed sensor data stream via connection 52 to an off-rig system 54. The off-rig system 54 may be located at a monitoring site that is configured to enable an engineer or computer to assess and monitor a rig site system that may be located a large distance (e.g., 500 miles) from the office. In another example the off-rig system 54 may be substantially co-located with the rig site system to reduce cabling at the rig site. Further, the off-rig system 54 may be connected to and centrally located among several rig sites for off-rig monitoring of each of a plurality of local rig site systems 32. The off-rig system 54 may include appropriate hardware and software configured to enable an engineer or Operations Support Center personnel to analyze and assess the state of a rig site system substantially in real time as the data is acquired by rig site sensors 26. For instance, if the telemetry rig data is difficult to demodulate, the off-rig system 54 can provide computing resources to attempt various sophisticated demodulation techniques, including filtering, signal processing, noise reduction, noise estimation, channel estimation, channel adaptation, digital phased locked loop, and other processing techniques. Resources may enable multiple analysis techniques to be used in parallel Specifically, the operations performed in the off-rig system 54 may be performed substantially in real time with respect to similar operations in local system 32, where substantially in real time may be within about five seconds of the display and processing that occurs at the local system. In other words, the off-rig system 54 may perform analysis, processing, display, and other functions substantially simultaneously substantially in real time, with respect to the same operations at a rig site system, thereby enabling an engineer or Operations Support Center personnel at an off-rig location to quickly assess the status and operation of a rig site system.

In addition, off-rig system 54 includes an off-rig processing system 56 that may be configured to demodulate the pre-processed sensor data stream, perform transforms, filter and/or process the transferred pre-processed sensor data. After processing in off-rig processing system 56, the data may be transmitted such as via a bus 57 to a user interface 58, which is configured to display telemetry and surface sensor data that enable an engineer or Operations Support Center personnel (or computer) to assess the state of the rig site system substantially in real time. Further, the user interface 58 may enable an engineer or Operations Support Center personnel or computer to adjust rig site and data acquisition system settings. Adjustments to rig site and data acquisition system settings may be then transmitted back to the local rig site via communication system 46 and data network links 42, 50. In addition, the setting adjustments that are communicated via link 59 may be surface and/or well system adjustments that may be applied to the data acquisition system 12 and preprocessing system 28 and/or rig site system 32. In an embodiment, off-rig system 54 may be configured to detect certain data indicative of a rig site event and automatically adjust system settings, based on a computer program, trended data, or other logic, wherein a processor and software manages the rig site system adjustments, rather than a user.

Figure 3:
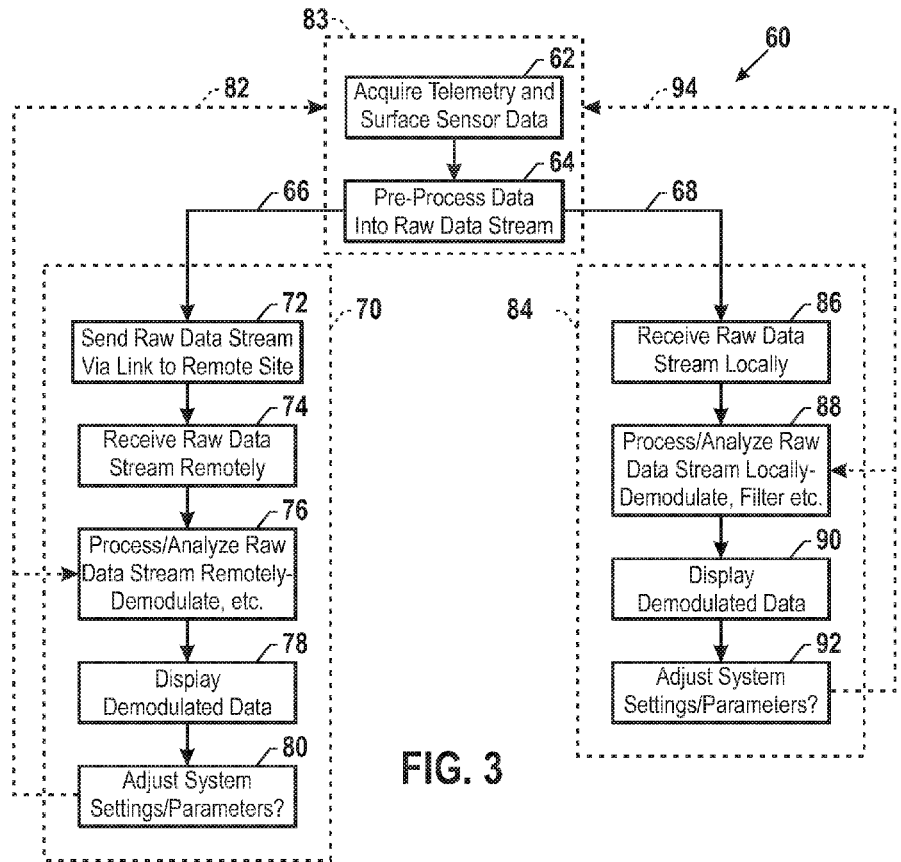
FIG. 3 is a flowchart describing a technique for off-rig analysis of rig site telemetry and surface sensor data in accordance with an embodiment.

Turning to FIG. 3, a flow chart 60 illustrates a technique for off-rig analysis of rig site telemetry data. In the first step 62, telemetry and surface sensor data may be acquired by local data acquisition system 12. The data acquired at a rig site may include any relevant measurements that may be used to assess the operation and performance of an oil rig site/well site system. For example, rig site data may include surface data, such as hook load, torque, drill pipe rotation rate—revolutions per minute (RPM), pump speed, and pump pressure. The surface data may pertain to multiple pumps at a rig site. In addition, well data at the rig may include temperature, pressure, radiation, resistivity, sonic, and pipe stress. The well data may be acquired from a variety of sensors located downhole at the rig site, and telemetered uphole, as well as sensors located about the rig site.

In step 64, the acquired data is preprocessed via a preprocessing system 28 at the rig site. For example, a computer or controller system may receive the telemetry and surface sensor data measurements and may include a processor and software configured to preprocess the telemetry and surface sensor data acquired by the data acquisition system 12. Preprocessing of the telemetry and surface sensor data may include packing, compressing, or stripping the telemetry and surface sensor data to produce a low bandwidth pre-processed sensor data stream, which may be transmitted via a network link to an off-rig location for analysis by an engineer or Operations Support Center personnel. In step 66, the pre-processed sensor data stream may be transmitted to a monitoring site 70 for viewing and analysis of a rig site system status. In addition, the preprocessing system may also communicate telemetry and surface sensor data or pre-processed sensor data to a local (rig site) processing system in step 68, as will be discussed in detail below.

In step 72, the low bandwidth pre-processed sensor data stream is sent via a network link to the monitoring site for analysis. As previously discussed, the communication system 46 may include a satellite system, cellular based system, and/or a cable based system. In step 74, the pre-processed sensor data stream is received at the monitoring site from the communication system that includes an off-rig network link 50. In step 76, the pre-processed sensor data stream is processed off-rig for analysis at the monitoring site. An off-rig processing system may include a processor, hardware components, and software to perform signal analysis and data translation functions. Specifically, the pre-processed sensor data stream may be demodulated to enable further processing of the data, such as filters, transforms, and other functions. In step 78, the demodulated data may be displayed in a substantially real time fashion, as will be discussed below. In step 80, the engineer or Operations Support Center personnel may choose to adjust system settings and/or system parameters based on analysis of the demodulated data or, based on predetermined threshold values, the system may automatically adjust system settings and/or system parameters without user interaction.

As adjustments to the system settings and/or system parameters are enacted, the changes in system settings may be communicated 82 back to the rig site system 83, thereby affecting the data acquisition system 12 located at the rig site. For example, a frame definition of a tool, used to interpret a bit stream of rig site data, can be changed at the off-rig site by a engineer or Operations Support Center personnel or the system based on analysis of the demodulated data. The frame definition is synchronized between components in the downhole tool (rig site), the surface computer at the rig site, and the off-rig site to enable proper communication of rig site telemetry and surface sensor data and information. Further, sensors such as hook load sensors are calibrated periodically and the new coefficients are synchronized between the rig site and off-rig site systems. Sensors at the rig site may receive error correction via coefficients and other methods, which may be implemented via the off-rig location and synchronized with the systems and components at the rig site. Further, settings adjustments may also be transmitted in a step 82 to the off-rig processing and analysis block 76 as a means of feedback.

As previously discussed, the preprocessing data block may also send telemetry and surface sensor data or pre-processed sensor data directly 68 to the rig site processing system 84 located at the rig site. The rig site processing system 84 may include several components to enable an engineer or Operations Support Center personnel to view and analyze rig site telemetry data. For instance, in block 86, the pre-processed sensor data stream may be received locally by a computer system at the rig site from the pre-processing system. In step 88, the pre-processed sensor data stream may be processed and analyzed locally by a computer or other system configured to perform such operation. Computer hardware and software may be used to demodulate the pre-processed sensor data, as well as to filter the pre-processed sensor data. As previously discussed, the processing and display of the demodulated data may occur substantially in real time at the monitoring site, where the processes may be performed and displays shown within about five seconds of the same operations at the rig site.

For example, steps 76 and 88 may be performed substantially in real time, where the processing occurs both locally and off-rig within about five seconds of each other. In step 90, the demodulated and processed data may be displayed by a display, such as an LCD display monitor. Further, the displayed data may be presented in a manner, such as graphs or trend charts, which enable an engineer or Operations Support Center personnel to assess the state of the rig site system. In step 92, system settings and/or system parameters may be adjusted, either by an engineer manually or automatically by the system, based on the analysis and display of telemetry and surface sensor data at the rig site location. The settings adjustments may be communicated back to the rig site 83, as shown by arrow 94, thereby adjusting system settings that will enable efficient operation of the rig site and proper acquisition of telemetry and surface sensor data at the site. Further, settings adjustments may also be transmitted 94, to the local rig site processing and analysis block 88.

Figure 4:
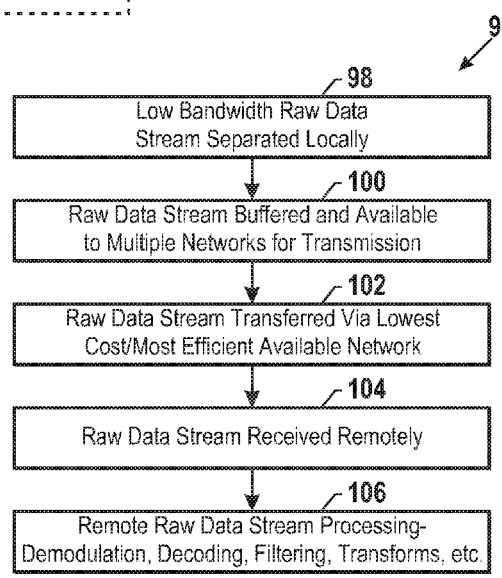
FIG. 4 is a flowchart describing a technique for transmitting rig site telemetry and surface sensor data to a monitoring site location for off-rig demodulation in accordance with an embodiment.

Turning to FIG. 4, a flow chart 96 illustrates a technique for transmitting rig site telemetry and surface sensor data to an off-rig site. In step 98, low bandwidth pre-processed sensor data is packed or stripped from sensor data at a rig site location. Specifically, telemetry and surface sensor data is received from a local data acquisition system 12 and is processed to output a low bandwidth pre-processed sensor data stream for transmission to an off-rig location. In step 100, the pre-processed sensor data stream is then buffered and made available to network links for transmission to an off-rig location. The data is buffered to ensure that data is not lost during transmission to an off-rig location. Several network links may be available for data transmission, where a primary network is selected due to a variety of factors, including costs, efficiency, reliability, and availability. If the primary network is not available or undesirable, then a redundant or backup network may be utilized to transmit the data. In this case, the pre-processed sensor data stream may be buffered by the data network links or other hardware to ensure that data is not lost during transmission and/or switching between network link providers. For example, the primary network link may be a satellite based network link for a system. The satellite network link may become unavailable, in which case a cellular-based network link may be used as a backup network link. In step 102, the pre-processed sensor data stream is transferred via the primary network that has been selected. In step 104, the low bandwidth pre-processed sensor data stream is received off-rig, where the rig site telemetry and surface sensor data may be viewed and analyzed, either by a engineer or Operations Support Center personnel or according to various rig site event detecting algorithms not the subject of the present disclosure. In step 106, the pre-processed sensor data stream is processed at the monitoring site, which may include demodulation, decoding, filtering, data transforms and/or other data processing functions.

Figure 5:
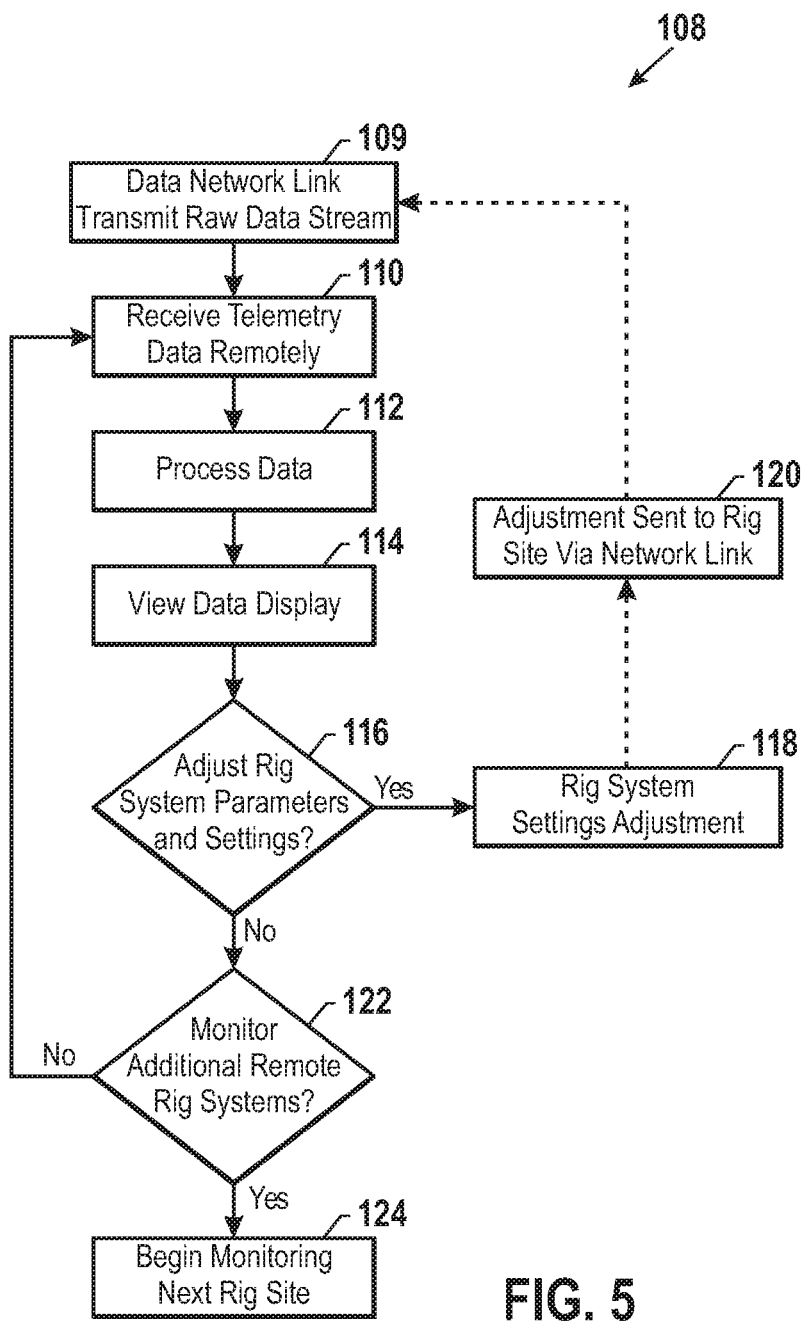
FIG. 5 is a flowchart describing a process of receiving telemetry and surface sensor data at a location apart from the rig site in accordance with an embodiment.

FIG. 5 is a flow chart 108 describing the process of off-rig receiving telemetry and surface sensor data for analysis. In step 109, data network links provide a suitable transmission link or links to communicate between an off-rig site and a rig site location and transmits the pre-processed sensor data stream discussed above. In step 110, the telemetry and surface sensor data is received at the monitoring site location via a data network link. As previously described, the pre-processed sensor data stream may be a low bandwidth, pre-processed sensor data stream that is communicated via a satellite network link or other appropriate network connection. In step 112, the pre-processed sensor data stream may be demodulated and processed for viewing at the off-rig location. The data processing may include demodulation and other data processing functions, such as high or low pass filters and IQ transforms. In step 112, the engineer or Operations Support Center personnel may view the demodulated data display and the data analysis at the monitoring site, such as at a central Operations Support Center (OSC) office. In step 114, based on the pre-processed sensor data analysis, the engineer or Operations Support Center personnel may decide whether to adjust rig site system parameters and/or system settings. If the engineer or Operations Support Center personnel chooses to adjust system settings, then the system adjustments may be sent to be implemented at the rig site, as depicted in step 118. Further, these system settings adjustments may be communicated via the network link 109 back to the rig site location and may affect rig operations as well as rig site data acquisition of telemetry data, as shown in step 120. If the engineer or Operations Support Center personnel chooses not to adjust the system parameters and settings, the engineer or Operations Support Center personnel may choose to monitor additional rig systems (step 122) that are not co-located with the monitoring site. For instance, an engineer or Operations Support Center personnel at a centrally located (i.e., central in the networking sense) monitoring site may monitor several rig sites located in locations distant from the central site, which each may be a great distance, such as 1000 miles. If the engineer or Operations Support Center personnel chooses to not to monitor additional systems, then the engineer or Operations Support Center personnel will continue the process with the current rig site system at step 110. If the engineer or Operations Support Center personnel, chooses to monitor additional rig site systems, the off-rig monitoring process may begin for the next rig site in step 124, which may resume flow chart 108 for the new rig site. As previously discussed, the steps and logic performed in flow chart 108 may be executed by an operator and/or an automated program and processor according to a rig site event detection algorithm not the subject of the present disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:
1. A method for monitoring a rig site system, comprising:
   obtaining sensor data at a rig site;

compressing the sensor data to produce pre-processed sensor data having a reduced bandwidth for transmission;

transmitting the pre-processed sensor data pertaining to the sensor data from the rig site over a primary network link or a backup network link to a monitoring site, wherein the primary network link automatically switches to the backup network link when the primary network link is unavailable, and the backup network link automatically switches back to the primary network link when the primary network link becomes available;

demodulating the pre-processed sensor data at the monitoring site to produce demodulated data;

demodulating the pre-processed sensor data at the rig site substantially simultaneously with respect to demodulating the pre-processed sensor data at the monitoring site to produce redundantly demodulated pre-processed sensor data at the rig site;

generating a rig site display at a first user interface at the rig site, the rig site display comprising; the redundantly demodulated pre-processed sensor data, wherein the first user interface is configured to receive one or more commands from a user that adjusts a rig site parameter based on the user's command;

generating a monitor site display at a second user interface at the monitoring site, the monitor site, display comprising demodulated pre-processed sensor data displayed at substantially the same time the redundantly demodulated pre-processed sensor data is displayed on the first user interface, wherein the second user interface is configured to receive one or more off-rig commands from an off-rig user that adjusts a rig site parameter based on the user's off-rig command; and analyzing the demodulated data at the monitoring site.

2. The method of claim 1, further comprising redundantly demodulating the pre-processed sensor data at the rig site.

3. The method of claim 1, wherein the sensor data comprises at least one of surface sensor data, measurements while drilling sensor data, or logging while drilling sensor data.

4. The method of claim 1, further comprising filtering the pre-processed sensor data at the monitoring site.

5. The method of claim 1, further comprising performing a transform on the pre-processed sensor data at the monitoring site.

6. The method of claim 1, further comprising encrypting the sensor data to produce pre-processed sensor data.

7. The method of claim 1, further comprising adjusting one or more system parameters at the monitoring site to produce a change at the rig site.

8. The method of claim 7, further comprising transmitting the system parameters to the rig site via the network link.

9. The method of claim 1, wherein a ratio of a bandwidth of the sensor data to a bandwidth of e pre-processed sensor data is between 4:1 and 240:1.

10. A rig site monitoring system, comprising:

a local data acquisition system configured to receive sensor data at a rig site, wherein the local data acquisition system comprises a local processor configured to pre-process the sensor data by compressing the sensor data to produce pre-processed sensor data having a reduced bandwidth for transmission;

a primary network link configured to transmit the pre-processed sensor data from the rig site to a monitoring site;

a backup network link configured to transmit the pre-processed sensor data from the rig site to the monitoring site when the network link is unavailable, wherein the system automatically switches to the backup network link when the primary network link is unavailable, and the system automatically switches back to the primary network link when the primary network link becomes available;

an off-rig monitoring and control system located at the monitoring site, Wherein the off-rig monitoring and control system comprises an off-rig processor configured to demodulate the pre-processed sensor data to produce demodulated data substantially simultaneously with respect to demodulation of the pre-processed sensor data by the local processor configured to produce redundantly demodulated pre-processed sensor data, wherein the off-rig processor is further configured for analysis of the rig site based on the demodulated data;

a first user interface at the rig site configured to display the redundantly demodulated pre-processed sensor data, wherein the first user interface is configured to receive one or more commands from a user that adjusts a rig site parameter based on the user's command; and a second user interface at the monitoring site configured to display the demodulated pre-processed sensor data at substantially the same time the redundantly demodulated pre-processed sensor data is displayed on the first user interface, wherein the second user interface is configured to receive one or more off-rig commands from an off-rig user that adjusts a rig site parameter based on the user's off-rig command.

11. The system of claim 10, wherein the local data acquisition system is configured to redundantly demodulate the pre-processed sensor data.

12. The system of claim 10, wherein the off-rig monitoring and control system is configured to perform a transform on and filter the pre-processed sensor data.

13. The system of claim 10, wherein the primary network link comprises a plurality of redundant networks.

14. The system of claim 13, wherein the plurality of redundant networks comprises at least one of a satellite system and a cellular system.

15. The system of claim 10, wherein a ratio of a bandwidth of the sensor data to a bandwidth of the pre-processed sensor data is between 4:1 and 240:1.

16. A rig site monitoring system, comprising:

a local data acquisition system configured to receive sensor data at a rig site, wherein the local data acquisition system is configured to pre-process the sensor data by compressing the sensor data to produce pre-processed sensor data having a reduced bandwidth for transmission, wherein the local data acquisition system is also configured to redundantly demodulate the pre-processed sensor data at the rig site;

a primary network link configured to transmit the pre-processed sensor data from the local data acquisition system to a monitoring site, wherein the monitoring site is configured to receive pre-processed sensor data from multiple local data acquisition systems located at different rig sites, each rig site of the different rig sites including a separate oil rig;

a backup network link configured to transmit the pre-processed sensor data from the rig site to the monitoring site when the network link is unavailable, wherein the system automatically switches to the backup network link when the primary network link is unavailable, and the system automatically switches back to the primary network link when the primary network link becomes available;

an off-rig processor located at the monitoring site, wherein the off-rig processor is configured to demodulate the pre-processed sensor data to produce demodulated data substantially simultaneously with respect to demodulation of the pre-processed sensor data by the local data acquisition system configured to redundantly demodulate the pre-processed sensor data to produce redundantly demodulated pre-processed sensor data;

a first user interface at the rig site configured to display the redundantly demodulated pre-processed sensor data, wherein the first user interface is configured to receive one or more commands from a user that adjusts a rig site parameter based on the user's command; and a second user interface at the monitoring site configured to display the demodulated pre-processed sensor data at substantially the same time the redundantly demodulated pre-processed sensor data is displayed on the first user interface, wherein the second user interface is configured to receive one or more off-rig commands from an off-rig user that adjusts a rig site parameter based on the user's off-rig command.

17. The system of claim 16, wherein rig site adjustments are transmitted via the primary network link to the local data acquisition system.

18. The system of claim 16, wherein the local data acquisition system is configured to perform a transform on the pre-processed sensor data.

19. The system of claim 16, wherein the local data acquisition system is configured to filter the pre-processed sensor data.

20. The system of claim 16, wherein the off-rig processor located at the monitoring site is configured to perform a transform on and filter the pre-processed sensor data.

21. The system of claim 16, wherein the local data acquisition system is configured to encrypt the pre-processed sensor data.

22. The system of claim 16, wherein the primary network link comprises a plurality of redundant networks, wherein the redundant networks include at least one of a satellite system and a cellular system.

23. The system of claim 16, wherein the second user interface is coupled to the off-rig processor.

24. The system of claim 16, wherein at least one of the first user interface or the second user interface is further configured to adjust settings of the local data acquisition system, wherein the settings are transmitted to the local data acquisition system via the primary network link.

25. The system of claim 24, wherein the settings are received by command of a user or implemented automatically by the off-rig processor.

26. The system of claim 16, wherein a ratio of a bandwidth of the sensor data to a bandwidth of the pre-processed sensor data is between 4:1 and 240:1.

27. The system of claim 16, wherein the monitoring site receives pre-processed sensor data from local data acquisition systems located at two or more rig sites.

28. The system of claim 27, wherein the monitoring site further comprises a user interface configured to display the pre-processed sensor data from the two or more rig sites.

29. The system of claim 28, wherein the user interface at the monitoring site is configured to receive commands from a user, and wherein the user can adjust a rig site parameter at one or more of the two or more rig sites.

30. The system of claim 29, wherein the pre-processed sensor data comprises at least one of surface sensor data, measurements while drilling sensor data, or logging while drilling sensor data.

31. A method for monitoring a rig site system, comprising:
acquiring sensor data at a rig site;
pre-processing the sensor data at the rig site by compressing the sensor data to produce pre-processed sensor data having a reduced bandwidth for transmission;
transmitting the pre-processed sensor data from the rig site over a primary network link or a backup network link to a monitoring site, wherein the primary network link automatically switches to the backup network link when the primary network link is unavailable, and the backup network link automatically switches back to the primary network link when the primary network link becomes available;
demodulating the pre-processed sensor data at the monitoring site to produce demodulated data;
demodulating the pre-processed sensor data at the rig site substantially simultaneously with respect to demodulating the pre-processed sensor data at the monitoring site to produce redundantly demodulated pre-processed sensor data at the rig site;
generating a rig site display at a first user interface at the rig site, the rig site display comprising the redundantly demodulated pre-processed sensor data, wherein the first user interface is configured to receive one or more commands from a user that adjusts a rig site parameter based on the user's command; and
generating a monitor site display at a second user interface at the monitoring site, the monitor site display comprising demodulated pre-processed sensor data displayed at substantially the same time the redundantly demodulated pre-processed sensor data is displayed on the first user interface, wherein the second user interface is configured to receive one or more off-rig commands from an off-rig user that adjusts a rig site parameter based on the user's off-rig command.

32. The method of claim 31, further comprising analyzing the demodulated data at the monitoring site.

33. The method of claim 32, further comprising adjusting rig site system parameters based on the demodulated data at the monitoring site.

34. The method of claim 33, wherein adjusting the rig site system parameters comprises receiving a command of a user or automatically implementing an adjustment stored in a memory by a processor.

35. The method of claim 31, further comprising:
generating the rig site display by processing the pre-processed sensor data a e rig site; and
generating the monitoring site display, wherein generating the rig site display and generating the monitoring site display are performed approximately simultaneously.

36. The method of claim 35, wherein generating the rig site display and generating the monitoring site display are synchronized substantially in real time.

37. The method of claim 31, wherein a ratio of a bandwidth of the sensor data to a bandwidth of the pre-processed sensor data is between 4:1 and 240:1.

* * * * *

UNITED STATES PATENT AND TRADEMARK OFFICE
CERTIFICATE OF CORRECTION

Page 1 of 1

PATENT NO.         : 9,260,942 B2
APPLICATION NO.    : 12/745817
DATED              : February 16, 2016
INVENTOR(S)        : Remi Hutin et al.

It is certified that error appears in the above-identified patent and that said Letters Patent is hereby corrected as shown below:

Title Page

(60) Related U.S. Application Data:

Provisional application No. is corrected from "60/922,356" to --60/992,356--.

Signed and Sealed this
Fourteenth Day of June, 2016

Michelle K. Lee
*Director of the United States Patent and Trademark Office*